(12) United States Patent
Bouchard et al.

(10) Patent No.: US 8,643,876 B2
(45) Date of Patent: Feb. 4, 2014

(54) USER AND DEVICE LOCALIZATION USING PROBABILISTIC DEVICE LOG TRILATERATION

(75) Inventors: Guillaume Bouchard, Crolles (FR); Onno Zoeter, Grenoble (FR); Jean-Marc Andreoli, Meylan (FR); Victor Ciriza, La Tour du Pin (FR)

(73) Assignee: Xerox Corporation, Norwalk, CT (US)

(*) Notice: Subject to any disclaimer, the term of this patent is extended or adjusted under 35 U.S.C. 154(b) by 657 days.

(21) Appl. No.: 12/767,141

(22) Filed: Apr. 26, 2010

(65) Prior Publication Data

US 2011/0265086 A1 Oct. 27, 2011

(51) Int. Cl.
*G06F 3/12* (2006.01)
*G08B 1/08* (2006.01)

(52) U.S. Cl.
USPC ....... 358/1.15; 340/539.2; 600/407; 715/810; 726/1

(58) Field of Classification Search
USPC ...................................................... 358/1.15
See application file for complete search history.

(56) References Cited

U.S. PATENT DOCUMENTS

| | | | |
|---|---|---|---|
| 5,990,886 A | 11/1999 | Serdy et al. | |
| 2006/0071780 A1* | 4/2006 | McFarland | 340/539.2 |
| 2006/0132826 A1 | 6/2006 | Ciriza et al. | |
| 2006/0206445 A1 | 9/2006 | Andreoli et al. | |
| 2007/0283414 A1* | 12/2007 | Sugiyama | 726/1 |
| 2008/0004517 A1* | 1/2008 | Bhandarkar et al. | 600/407 |
| 2008/0256486 A1* | 10/2008 | Hagiwara | 715/810 |
| 2009/0279130 A1* | 11/2009 | Horiyama | 358/1.15 |
| 2009/0303537 A1* | 12/2009 | Matsumoto | 358/1.15 |
| 2010/0058121 A1 | 3/2010 | Bouchard et al. | |

OTHER PUBLICATIONS

Gaussinan Process (Dec. 1, 2007) http://bluecoat-01/?cfru= aHR0cDovL3NIZS5zdGFuZm9yZC5IZHUvbWF0ZXJpYWxzL2 FpbWxjczlyOS9jczlyOS1ncC5wZGY=.*
U.S. Appl. No. 12/488,900, Merriam et al.
Or, et al. Highly Automatic Approach to Architectural Floor plan Image Understanding & Model Generation, Proceedings of 10th Fall Workshop Vision, Modeling, and Visualization, pp. 25-32 (2005).

(Continued)

Primary Examiner — Huo Long Chen
(74) Attorney, Agent, or Firm — Fay Sharpe LLP

(57) ABSTRACT

A system and method of localizing elements (shared devices and/or their users) in a device infrastructure, such as a printing network, are provided. The method includes mapping a structure in which the elements of a device infrastructure are located, the elements comprising shared devices and users of the shared devices. Probable locations of fewer than all of the elements in the structure are mapped, with at least some of the elements being initially assigned to an unknown location. Usage logs for a plurality of the shared devices are acquired. The acquired usage log for each device includes a user identifier for each of a set of uses of the device, each of the uses being initiated from a respective location within the mapped structure by one of the users. Based on the acquired usage logs and the input probable locations of some of the elements, locations of at least some of the elements initially assigned to an unknown location are predicted. The prediction is based a model which infers that for each of a plurality of the users, a usage of at least some of the shared devices by the user is a function of respective distances between the user and each of those devices.

20 Claims, 10 Drawing Sheets

(56) References Cited

OTHER PUBLICATIONS

Whiting, E. Geometric, Topological & Semantic Analysis of Multi-building Floor Plan Data. M.S. Thesis, MIT, Department of Architecture, May 2006.

Setalaphruk, et al. Topological Map Generation from Simplified Map for Mobile Robot Navigation. Proceedings of the Annual Conference of JSAI2002, vol. 16. pp. 109-110 (2002).

Dijkstra, E.W. A note on two problems in connexion with graphs. In Numerische Mathematik, 1 (1959), S269-271.

* cited by examiner

```
Static model
{
    gam ~ dnorm(1, 100)
    for( u in 1 : Nu ) {
        UPos.x[u] ~ dnorm(UPos0x[u],UPos0tau[u])
        UPos.y[u] ~ dnorm(UPos0y[u],UPos0tau[u])
    }
    for( d in 1 : Nd ) {
        DPos.x[d] ~ dnorm(DPos0x[d],DPos0tau[d])
        DPos.y[d] ~ dnorm(DPos0y[d],DPos0tau[d])
    }
    for( u in 1 : Nu ) {
        lambda[u] ~ dnorm(0, 0.001)
        for( d in 1 : Nd ) {
            ax[u,d] <- UPos.x[u] - DPos.x[d]
            ay[u,d] <- UPos.y[u] - DPos.y[d]
            dist[u,d] <- sqrt(ax[u,d]*ax[u,d] + ay[u,d]*ay[u,d])
        }
    }
    for( u in 1 : Nu ) {
        for( d in 1 : Nd ) {
            X[u,d] ~ dpois(mu[u,d])
            log(mu[u,d]) <- lambda[u] - gam*dist[u,d]
        }
    }
}
```

FIG. 7

```
Time-varying model1
{
    distCoeff ~ dnorm(1,100)
    for (t in 1 : T-1) {
        PUChange[t] = exp(-Deltat[t]*UChangeRate)
        PDChange[t] = exp(-Deltat[t]*DChangeRate)
    }
    for( u in 1 : Nu ) {
        UPos[u,1] ~ dmulti(UPos0[u,],1)
        for (t in 1 : T-1) {
            UChange[u,t] ~ dbin(PUChange[u,t],1)
            UNextPos[u,t] ~ dmulti(unifDistrib,1)
            UPos[u,t+1] <- UChange[u,t]*UNextPos[u,t] + (1-UChange[u,t])*UPos[u,t]
        }
    }
    for( d in 1 : Nd ) {
        DPos[d,1] ~ dmulti(DPos0[d,],1)
        for (t in 1 : T-1) {
            DChange[d,t] ~ dbin(PDChange[d,t],1)
            DNextPos[d,t] ~ dmulti(unifDistrib,1)
            DPos[d,t+1] <- DChange[d,t]*DNextPos[d,t] + (1-DChange[d,t])*DPos[d,t]
        }
    }
```

FROM FIG. 8A

```
for( d in 1 : Nd ) {
    for( k in 1 : K ) {
        S[d,k,1] ~ dmulti(State0[,d,k],1)
        for (t in 1 : T-1) {
            PFailure[d,k,t] = exp(-Deltat[t]*FailureRate[d,k])
            PRepair[d,k,t] = exp(-Deltat[t]*RepairRate[d,k])
            Failure[d,k,t] ~ dbin(PFailure[d,k,t],1)
            Repair[d,k,t] ~ dbin(PRepair[d,k,t],1)
            NextStateF[d,k,t] ~ dbeta(10,1)
            NextStateR[d,k,t] ~ dbeta(1,10)
            S[d,k,t+1] <- (1-Repair[d,k,t])*((1-Failure[d,t,k])*S[d,k,t] + Failure[d,t,k]*NextStateF[d,k,t]) + Repair[d,k,t]*NextStateR[d,k,t]
        }
    }
}
for( u in 1 : Nu ) {
    for( k in 1 : K ) {
        lambda[u,k]~dnorm(0,.001)
    }
}
for( u in 1 : Nu ) {
    for( d in 1 : Nd ) {
        for (t in 1 : T) {
            for( k in 1 : K ) {
                log(mu[u,d,k,t]) = lambda[u,k] - distCoeff*dist[u,d] + stateCoeff*S[d,k,t]
                M[u,d,k,t] ~ dpois(mu[u,d,k,t])
            }
            N[u,d,t] = sum(M[u,d,1:K,t])
        }
    }
}
```

FIG. 8B

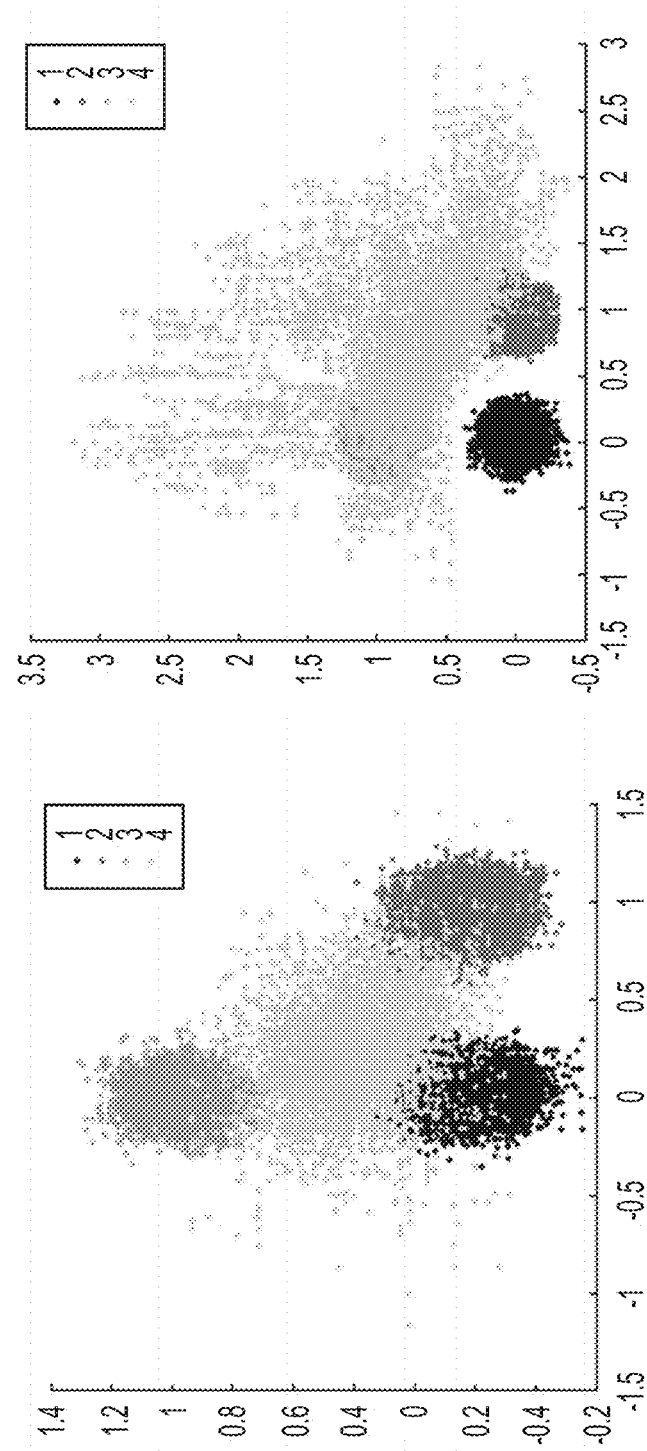

US 8,643,876 B2

USER AND DEVICE LOCALIZATION USING PROBABILISTIC DEVICE LOG TRILATERATION

BACKGROUND

The exemplary embodiment relates to a system and method for user and device localization within an infrastructure of shared devices. It finds particular application in connection with the localization of printers and their users in a printing network, although other shared devices are also contemplated.

For many device infrastructure optimization problems, a reasonably accurate layout of devices and users is advantageous. For example, printers and multifunction devices, having combinations of copying, printing, and faxing capabilities, are costly devices to operate and maintain and may have different functionalities. These may provide more or less utility to users depending on their location. Placement of appropriately functioned printers in locations where they are used most efficiently is therefore a goal of infrastructure administrators.

A precise layout map of the infrastructure, with location information for both users and devices, is sometimes systematically recorded by its administrators. However, it is frequently the case that this information is maintained manually, and soon becomes out of date or inaccurate. This may be because changes in user or device location have not been notified to the administrators, a new user or device has arrived, or one has left. Determining correct location information can therefore be time consuming and costly, in particular if the layout changes over time and hence the positions need to be re-determined with some frequency.

For many modern device infrastructures, such as multifunction device infrastructures, extensive usage logs exist. This allows a determination of which users are using a given printer. However, it does not indicate where the users are located.

The exemplary embodiment provides a system and method for localizing users and devices on a map of the infrastructure, and enables detection of changes over time, with minimal manual intervention from administrators.

INCORPORATION BY REFERENCE

The following references, the disclosures of which are incorporated herein in their entireties by reference, are mentioned:

U.S. Pub. No. 2010/0058121, published Mar. 4, 2010, entitled VISUALIZATION OF USER INTERACTIONS IN A SYSTEM OF NETWORKED DEVICES, by Guillaume Bouchard, et al., discloses a system that identifies soft device failures within a system, including an interface that captures transactional data between one or more users and one or more devices within the system.

U.S. Pub. No. 2006/0206445, published Sep. 14, 2006, entitled PROBABILISTIC MODELING OF SHARED DEVICE USAGE, by Jean-Marc Andreoli, et al., discloses a method for estimating parameters of a probability model that models user behavior of shared devices offering different classes of service for carrying out jobs. The method includes recording usage job data of observed users and devices carrying out the jobs, defining a probability model with an observed user variable, an observed device variable, a latent job cluster variable, and a latent job service class variable, determining a range of service classes associated with the shared devices, selecting an initial number of job clusters, learning parameters of the probability model using the recorded job usage data, the determined range of service classes, and the selected initial number of job clusters. The learned parameters of the probability model can be applied to evaluate a configuration of the shared devices, use of the shared devices, and job redirection between the shared devices.

U.S. Pub. No. 2006/0132826, published Jun. 22, 2006, entitled AUTOMATED JOB DIRECTION AND ORGANIZATION MANAGEMENT, by Victor Ciriza, et al., discloses a method and apparatus for managing a plurality of communicatively coupled systems. The method includes collecting job log data, determining a user community for each of the plurality of systems using the job log data, calculating overlapping communities for pairs of the plurality of systems, and defining a redirection matrix using the overlapping communities for managing operation of the plurality of systems.

U.S. Pat. No. 5,990,886, issued Nov. 23, 1999, entitled GRAPHICALLY CREATING E-MAIL DISTRIBUTION LISTS WITH GEOGRAPHIC AREA SELECTOR ON MAP, by Holly Serdy, et al., discloses placing users on a geographic map and manually selecting a distribution list by drawing areas on the map.

U.S. application Ser. No. 12/488,900, filed Jun. 22, 2009, entitled OPTIMAL MAPPING OF A SPATIAL PRINT INFRASTRUCTURE by Merriam, et al., discloses a printing device placement system including a memory device storing a floor plan of a space, a processor determining a first location in the space for placing a printing device, and further defining successive contour regions comprising at least a first contour region immediately adjacent to and surrounding the first location and a second contour region immediately adjacent to and surrounding the first contour region, wherein the first contour region comprises a more advantageous region for placing the printing device than the second contour region. A plotter is operatively connected to the memory device and the processor, the plotter forming, on the floor plan, a mark representing the first location and contour lines indicating the successive contour regions.

BRIEF DESCRIPTION

In accordance with one aspect of the exemplary embodiment, a method of localizing users and shared devices in a device infrastructure includes mapping a structure in which users of shared devices in a device infrastructure and the shared devices are located, wherein probable locations of fewer than all of the shared devices and/or users in the structure are input. At least some of the devices and/or users are initially assigned to an unknown location. The method further includes acquiring usage logs for a plurality of the shared devices, the acquired usage log for each device comprising a user identifier for each of a set of uses of the device, each of the uses being initiated from a respective location within the mapped structure by one of the users. Based on the acquired usage logs and the input probable locations of users or devices, a location of one or more of the users and/or shared devices initially assigned to an unknown location are predicted. The prediction is based a model which infers that for each of a plurality of the users, a usage of at least some of the shared devices by the user is a function of respective distances between the user and each of those devices. The predicted locations are output.

In accordance with another aspect of the exemplary embodiment, a system for localization of users and shared devices in a device infrastructure includes a graphing component which graphs a structure and probable locations of fewer than all of a plurality of shared devices and a plurality of users located within the structure. An acquisition component acquires usage log data from a plurality of shared devices in a device infrastructure, the usage log of each device comprising a user identifier for each of a set of uses of the device, each of the uses being initiated from a respective location by one of the users. A predicting component is configured for predicting locations of users and/or shared devices, for which the location in the graphed structure is initially unknown, based on the acquired usage logs, the prediction being based at least in part on a model which infers that usage of at least some of the devices by users is a function of a distance between the user and the respective device. A computer processor implements the components.

In another aspect, a method includes graphing a structure, in which printers and their users are physically located, as a graph, the graph representing regions of the structure as nodes, the nodes being connected by edges representing walking distances between the regions. Probable locations of at least some of the printers and/or users are input to the graph, others of the printers and/or users being each initially assigned to an unknown location. Print job data for the printers is acquired which includes, for each submitted print job, a user identifier. Based on the acquired print job data and probable locations, the method includes predicting a location of at least some of the users and/or shared devices initially assigned to the unknown location, the prediction being based on the input probable locations and a model which infers that for each of a plurality of the users, a usage of at least some of the shared devices by the user is a function of respective distances between the user and each of those devices. The predicted locations are output.

BRIEF DESCRIPTION OF THE DRAWINGS

FIG. 7 illustrates exemplary code for the static model of FIG. 6;

FIG. 8 illustrates exemplary code for a time-varying system;

FIG. 9 illustrates a sample of the posterior distribution for the device locations in a first simplified example shown in Table 1; and FIG. 10 illustrates a sample of the posterior distribution for the device locations in a second simplified example shown in Table 2.

DETAILED DESCRIPTION

Aspects of the exemplary embodiment relate to a localization system and a method for finding relative locations of users and devices (which may be referred to collectively as "elements") of a device infrastructure based on usage logs.

The method can be used to predict absolute positions of users and devices by combining usage logs with hand-labeled positions of only a small number of users and/or devices. While the devices in the exemplary embodiments are printers, other shared devices are also contemplated. The localization system may be located within a network of shared devices or be linked thereto, for receiving usage log data from multiple shared devices.

The exemplary localization system and method infer a model which models usage of devices, which can be used to predict element locations, based on the log data. The modeling of the user choice is based on the assumption that users tend to interact with the devices that are close to their physical location. Under this assumption, the relative positions of users and devices can be inferred based on a large number of user-device interaction logs. This is particularly useful to identify the infrastructure map when the positions are unknown.

Figure 1:
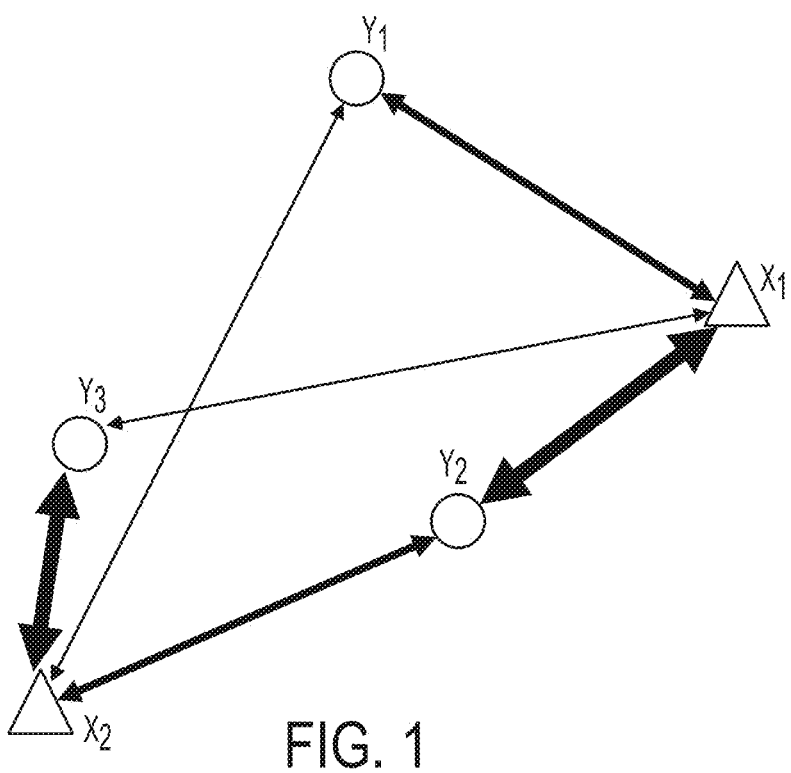
FIG. 1 is a graph illustrating usage of devices by users at different locations.

FIG. 1, for example, illustrates a simplified infrastructure. In this example, the physical space is $[0,1]^2$. Usage is assumed proportional to the thickness of arrows connecting users with devices. User 1 at location $X_1$ interacts mainly with Device 2 at location $Y_2$, sometimes with Device 1 at location $Y_1$, and very rarely with Device 3 at location $Y_3$. For user 2, the device preference order is Device 3, Device 2 and lastly Device 1. The model is able to infer information about relative positions based on the usage of plural devices by each user.

The term "printer," as used herein, broadly encompasses various shared devices, print shops or any kind of device location for which interaction logs can be recorded. In particular, printers can be devices for rendering an image on print media, such as a copier, laser printer, bookmaking machine, facsimile machine, or a multifunction device (MFD), which includes one or more functions such as scanning, printing, archiving, emailing, and faxing. A printer may utilize a marking material, such as ink(s) or toner(s) for rendering images on print media.

The term "print medium" generally refers to a physical sheet of paper, plastic, or other suitable physical print media substrate for images.

An interaction between a user and a device (e.g., printing, scanning, copying, etc.) is defined herein as a job. A "print job" or "document" is normally a set of related sheets, usually one or more collated copy sets copied from a set of original print job sheets or electronic document page images, from a particular user, or otherwise related. A print job generally includes a "printing object," which consists of one or more document images in a suitable format that is recognized by the printer, together with a "job ticket," which provides information about the print job as well as user information (a user ID) that may be used to identify the user submitting the job.

A "network printing system," as used herein, incorporates a plurality of shared devices, e.g., printers, which are accessible to one or more users via their respective personal computers, such as desktop computers, laptop computers, PDAs, and the like.

Figure 2:
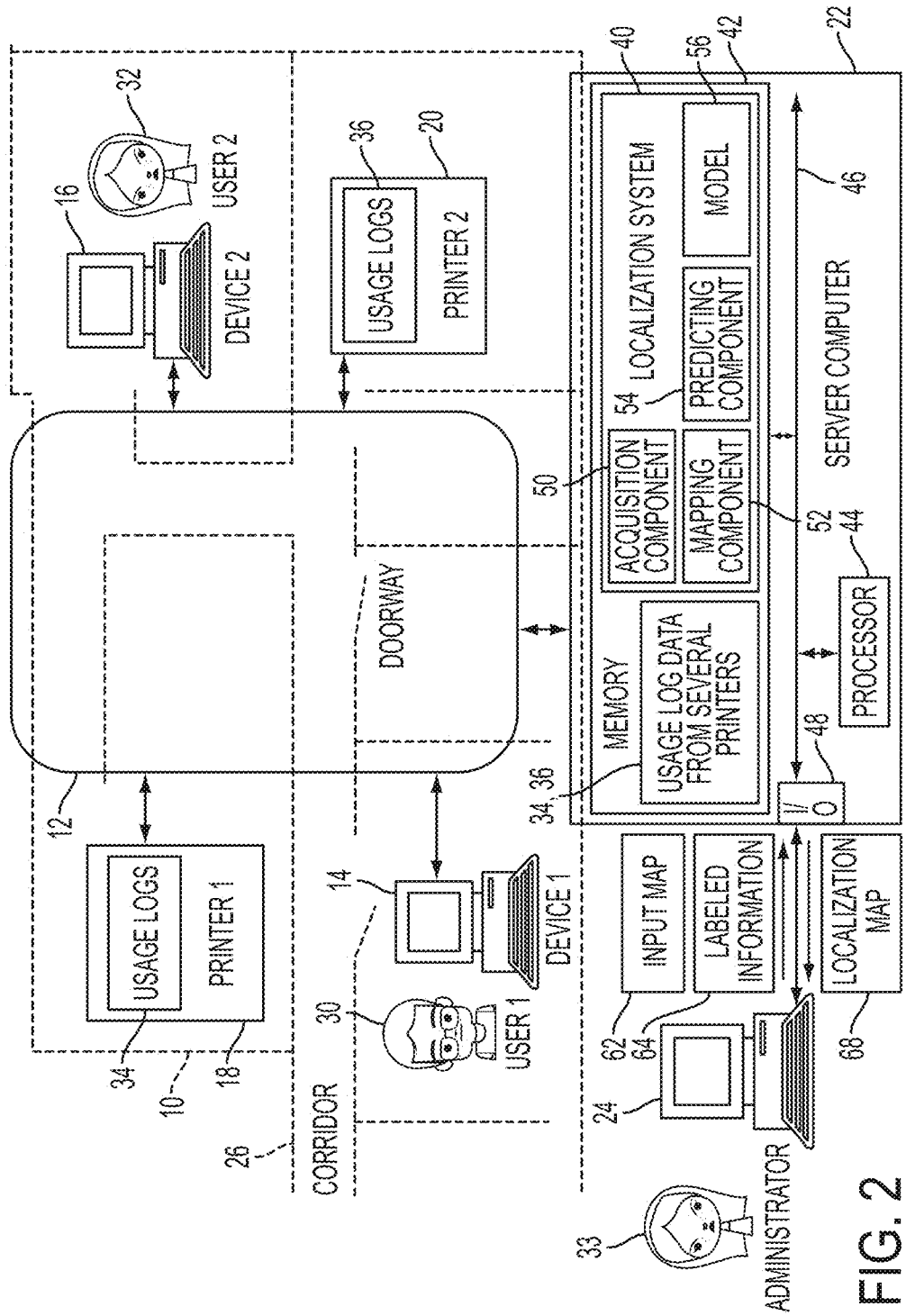
FIG. 2 is a functional block diagram of a network of shared devices located in a structure, such as a building, which includes a localization system in accordance with one aspect of the exemplary embodiment.

FIG. 2 is a diagram showing a network of shared devices in which the embodiments described herein may operate. In FIG. 2, an infrastructure such as a networked printing system 10 includes a wired or wireless network 12, which links various computing devices with an organization of shared network devices. Existing on the network 12 are, for purposes of illustrating the embodiments, a plurality of computers 14 and 16, linked by the network to a respective one or more of a plurality of shared devices, such as multifunction devices 18 and 20, referred to herein as printers 1 and 2. Optionally, also provided on network 12 is a print server 22, which acts as a virtual printing device to which all or some print requests on the network 12 may be spooled before being sent to a physical device 18, 20. The server may be linked to an administrator's computer 24, which may also be on the network 12.

The printing system 10 is physically located within a physical structure 26, such as a building or group of buildings which share the infrastructure 10, here represented by rooms, corridors, and the like, shown in phantom. It is assumed that each computer 14, 16 and each printer 18, 20, 24 has a location in the structure 26, such as in a room or corridor, and that each computer may, at any one time, be associated with a respective user 30, 32, 33 identifiable, in the network, by a unique ID (here illustrated as user 1 and user 2). The user's location is assumed to be that of the respective computer to which he or she is assigned. Over time, the locations of users and printers may change within the structure. Additionally, users/printers may be added or removed.

The exemplary network printing system 10 may be typical of those found in organizations where access to the network printers is limited to members of the organization, via their network accessible computers, and those permitted to copy hard copy documents on one of the printers without requiring network access.

The infrastructure 10 can employ wired and/or wireless technologies to couple the devices 18, 20 to the users' computers 14, 16 and/or to each other. Hubs, routers or other hardware (not shown) can be utilized to facilitate connection points for the devices and/or the users. In this manner, the users can connect to any of the devices within the infrastructure 10, or to at least a group of them. It is to be appreciated that the devices 18, 20 included in the infrastructure 10 are for representative purposes only and that any number and type of device can be employed in association with the infrastructure 10. The exemplary method is particularly suited to networks on which from about twenty to two hundred or more users have access to shared devices, of which there may be at least three and generally more than three devices, such as from about four to twenty or more shared devices. In general, there are fewer shared devices than users.

Each time a user 30, 32, 33 uses the print infrastructure he typically interacts with the device 18, 20 that is closest to his physical location. This may be the user's default printer, to which the user's print jobs are sent, unless the user elects to send the job to a different printer. Since the illustrated physical structure includes walls which define corridors and rooms, as well as other structures such as stairs, elevators, and the like, the closest printer may be defined by the time taken for the user to travel from his computer to the printer, which may be approximately correlated to the distance traveled. Thus, for example, user 1's closest printer may be printer 2 and user 2's closest printer may be printer 1.

Usage of devices can be determined from usage logs. For example each device 18, 20 stores usage logs 34, 36 in memory. The usage log may be in the form of electronic data and include details of each print job performed on the device, such as the number of pages, whether the job is color or monochrome, and the like, as well as a time stamp for the job, and the User ID, if available. The usage logs may be stored in memory on the respective device or elsewhere in the system 10. The usage logs thus reflect the actual day-to-day usage of the device 18, 20, by the device users, during operation of the device on the network 10.

Periodically, the usage logs, or data selected therefrom 34, 36, are uploaded to a localization system 40, which in the exemplary embodiment, is resident on the server 22, although it could alternatively be resident on any computing device on the network 12 or communicatively linked thereto. Briefly, the system 40 processes the usage log data 34, 36 acquired from several network devices 18, 20 to localize devices 18, 20 and/or users 30, 32 of the infrastructure 10. The exemplary localization system 40 includes instructions, stored in memory 42 which are executed by a linked processor 44, such as the server's CPU. Components 42, 44 of the system 40 are connected by a data control bus 46. One or more input/output (I/O) devices 48 link the computer to the network and to the administrator's computer 24.

The system 40 includes instructions for performing the localization method illustrated in FIG. 3, described below. These instructions, for ease of reference, are described in terms of software components 50, 52, 54 and a model 56, as explained in greater detail below. The software components include an acquisition component 50 which acquires the usage log data 34, 36 from several printers. A mapping (e.g., graphing) component 52 generates a simplified map 60 of the structure. In the exemplary embodiment graphing component 52 graphs the structure as a connectivity graph 60 (FIG. 4), based on an input map 62, such as a 2D map of the structure, although in some embodiments, the model 56 may take as direct input the 2D map 62. A prediction component 54 inputs the simplified map 60 and usage data into the model 56 for predicting device/user locations. Memory 42, or a separate memory, may be used to store the usage log data 34, 36, input map 62 and simplified map 60 during processing by the system 40.

The input map 62 may show the architectural features of the area of the structure in which the print infrastructure and its users are located, such as walls, corridors, doorways, stairs, and other permanent structures, such as file cabinets, bookcases and so forth, as well as showing areas of the structure where printers and/or users are not expected to be located, such as corridors (in the case of users), rest rooms, storage rooms, and the like.

In one exemplary embodiment, the probabilistic model 56 is input with a small amount of labeled information 64 in addition to the simplified map 60 of the structure. This assumes that a small portion of the users and devices is hand labeled. Then, the remaining users and devices are automatically placed on the map 60, based on the usage logs, by the prediction component 54, based on the output of the model 56. The system 40 outputs a localization map 68 (FIG. 5), on which some or all of the users/devices are localized. In the exemplary embodiment, the acquisition component 50 periodically polls the printers to acquire log data, which is used to update the map 68. In some instances, localization of some users/devices may not be possible based on the logs alone. In this case, the system can output a list of possible/probable locations.

By "localization" it is meant that the system 40 outputs a most probable location for a device or a user, or, where two or more locations have at least a threshold probability, the system may output the two or more most probable locations. This applies to the case where discrete locations are identified on the simplified map. Where there are no discrete locations, the localization may be in the form of a location distribution which shows the most likely positions for the device or user on the map.

Figure 3:
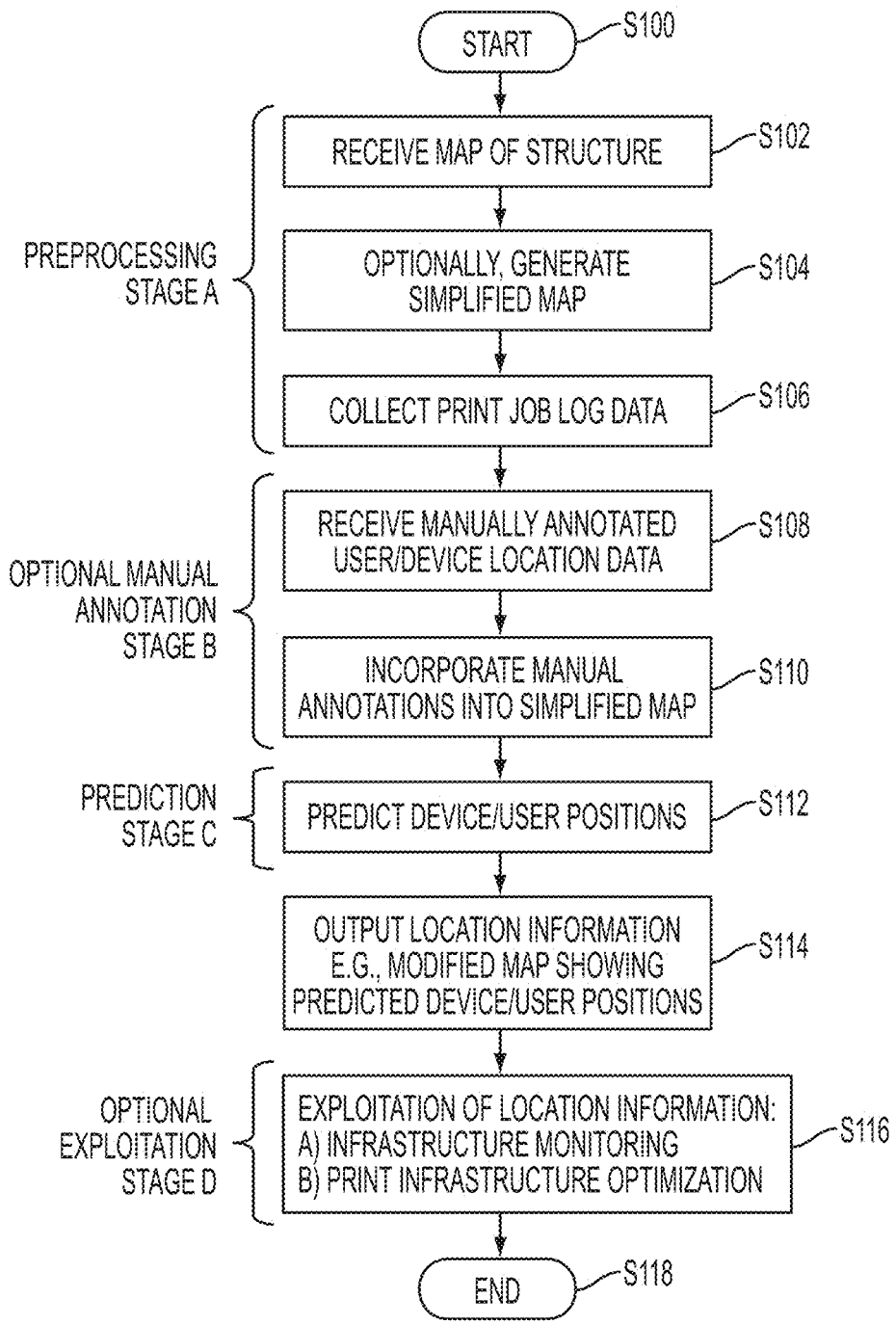
FIG. 3 illustrates a method for localizing users and devices of an infrastructure.

With reference to FIG. 3, an exemplary method for localizing users and/or shared devices in a device infrastructure 10 is illustrated. The method includes a preprocessing stage A, which includes generation of a simplified map 60 and acquisition of usage data 34, 36, an optional manual annotation stage B, in which a few users are manually located on the map 60, a prediction stage C, in which user and device locations are computed by the model 56. These stages may be followed by an exploitation stage D, in which the computed locations are used for one or more print infrastructure applications.

The method begins at S100.

At S102, the system 40 receives, as input, a two dimensional digitized map 62 which provides a floor plan of the structure, and stores it in memory 42.

At S104 a simplified map, e.g., in the form of a connectivity graph 60 is generated automatically by the graphing component 52 (FIG. 4), based on the input map 62. Alternatively, the simplified map 60 is input to the system directly.

At S106, the system 40 receives usage log data 34, 36, collected for the shared devices. Data may be collected for several days, weeks, or months and may be updated periodically. The data 34, 36 may be acquired directly from the devices themselves or from a print server, e.g., serving as a virtual printer. The usage data may be stored in the form of a table or other data structure which expresses the number of jobs (e.g., print jobs) submitted by each user to each device. In a more advanced model the jobs may be assigned a job type, such as color, black and white, etc., corresponding to services provided by various ones of the printers.

At S108, a small amount of labeled data 64 may be received by the system. The labeled data includes the IDs and locations of one or more users and/or one or more devices. For example, the administrator inputs a few known locations of users and devices via the administrator's computer. For example about 5% or 10% of the user locations may be input. Some or all of the device locations may additionally or alternatively be input.

At S110, the labeled data 64 is incorporated into the connectivity graph 60 by the graphing component 52.

At S112, the usage log data is processed by the model 56. This includes prediction of the most likely device and user positions.

At S114, device/user localization information may be output, e.g., the computed device and user positions predicted may be added to the connectivity graph 60 to generate the map 68 or may be otherwise graphically represented. Alternatively or additionally, the location information may be output to memory for later use.

At S116 the computed device and user positions may be exploited for one or more applications, such as a) infrastructure monitoring and/or b) print infrastructure optimization.

The method ends at S118.

Various aspects of the system and method will now be described.

The usage of printers 18, 20 by users of the print infrastructure 10 allows the printers and users to be localized by the localizing system 40. The localization may be more or less accurate depending on the structure of the building 24 and what information about the structure is provided, e.g., through map 62. Thus, while it may not be possible to localize a user or printer exactly, the probability of the user/device being found in a particular region of the structure 24 can be computed.

First, the regular use of a given device 18, 20 by a user 30, 32 gives information about closest pairs. Thus, for example, (user 1, printer 2) may be considered a closest pair for user 1. Special jobs that cannot be performed on all devices, the temporary unavailability of devices, or other reasons that prevent users from using the closest device, results in users making use of devices other than their closest device. User 1, for example, may use printer 1 for color print jobs from time to time if this service is not available on his closest printer. This use of one or more secondary printers allows relative locations to be determined based on relationships beyond pairs, hence breaking the symmetries and ambiguities that would remain if only pairs could be used. The procedure used is similar in nature to the process of trilateration. Trilateration is a geometric method for determining the intersections of spheres given their centers and radii. It is also similar to triangulation, as is used in navigation and map making, but it does not require using the angle between points to find the positions. Here, the usage of two or more printers by a user, for multiple device and user usages, allows their relative positions to be inferred and, based on a small amount of input location data, allows more exact location information to be inferred for devices and users.

The Probabilistic Model

The probabilistic user model 56 describes typical user behavior. It specifies how users 30, 32 interact with devices 18, 20 (e.g., it assumes that the users nearly always use the device that will perform the job and that is physically the closest) and hence explains how the logs are generated. This information can then be used to determine approximately the "closest" device-user pairs in the system.

To be able to triangulate, more than closest pair relationships are determined. The model 56 also explains situations where users for some reason or other do not use the closest device. For example the nearest device is broken or the nearest device cannot perform the requested task. For example, in a print infrastructure, the nearest device could be black-and-white only while the requested job includes color. In some settings it is not necessary to model these reasons in detail to obtain a reasonably accurate map 68.

Generation of the Connectivity Graph (S104)

Figure 4:
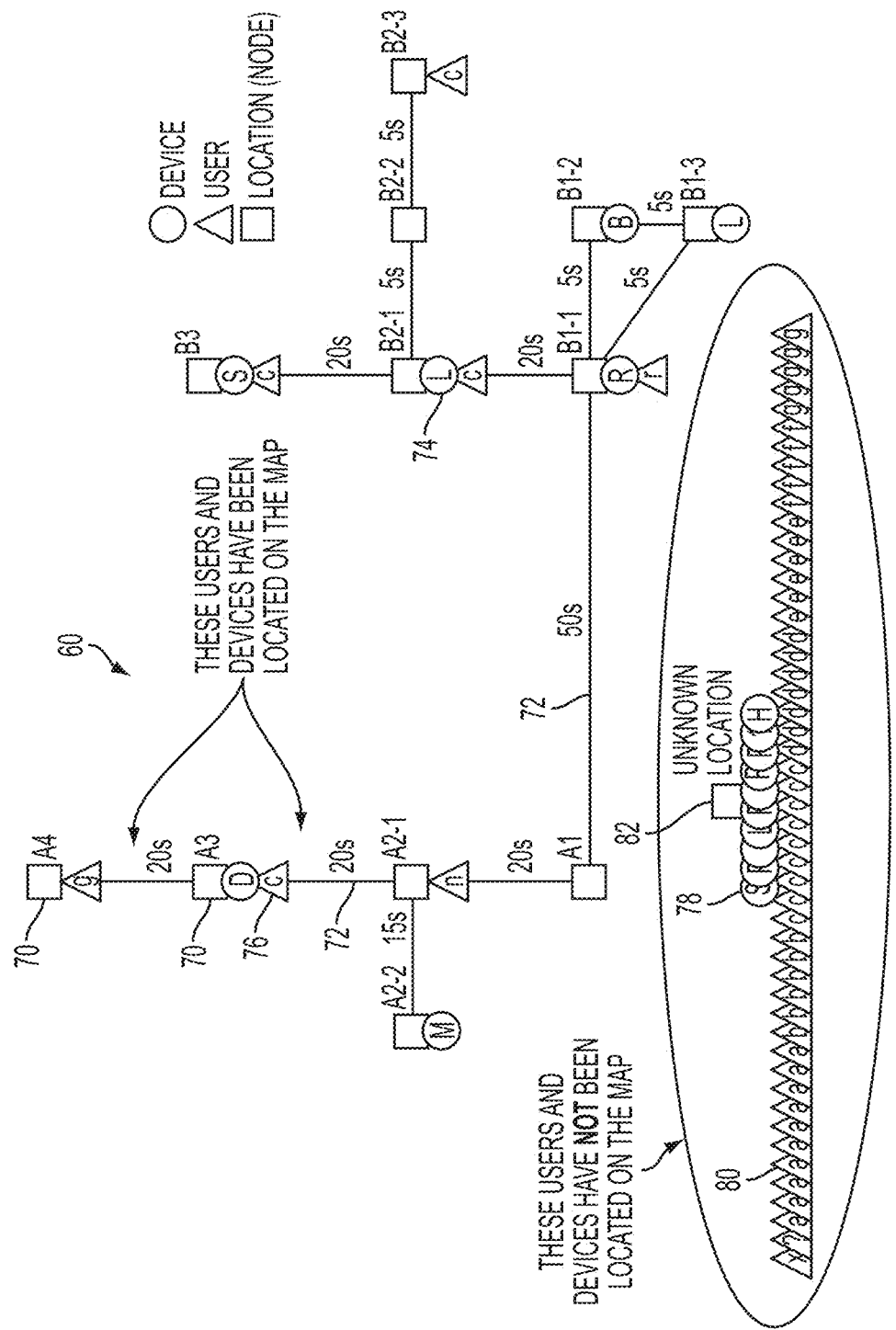
FIG. 4 illustrates a simplified map of a structure manually annotated to show locations of some users and devices.

FIG. 4 shows an exemplary connectivity graph 60. The graph 60 may be generated by computing the walking distance on the digitized map of the building. Floor plan-to-graph conversion is described, for example, in Siu-Hang Or, Kin-Hong Wong, Ying-Kin Yu, Michael Ming-Yuan Chang. Highly Automatic Approach to Architectural Floor plan Image Understanding & Model Generation, Proceedings of 10th Fall Workshop Vision, Modeling, and Visualization, pp. 25-32 (2005); Emily Whiting, Geometric, Topological & Semantic Analysis of Multi-building Floor Plan Data. M.S. Thesis, MIT, Department of Architecture, May 2006; Vachirasuk Setalaphruk, Atsushi Ueno, lzuru Kume, Yasuyuki Kono and Masatsugu Kidode. Topological Map Generation from Simplified Map for Mobile Robot Navigation. Proceedings of the Annual Conference of JSAI2002, vol. 16. pp. 109-110 (2002).

The method of Or, et al. recovers the vector structure of the walls given a floor-plan. This provides a 3D model of the building automatically. The same technique can be used to in the exemplary embodiment to compute a realistic walking distance between two points in the building and enable the model to propose locations that are feasible (i.e., not in the middle of corridors, not inside walls, etc.

The approach described in Whiting computes the walking distance between outdoor buildings or indoor offices by analyzing the floor plan, based on architectural principles. Using the method of Whiting, an automatic conversion from a floor plan into a graph may be performed where nodes represent rooms or corridors.

Setalaphruk, et al., provide a simple method to obtain a graph-based representation of a building map (called topological map) based on Voronoi tessellation technique.

The graph 60 shown in FIG. 4 is intended to be exemplary only and includes nodes 70 representing discrete locations in the structure which can be traveled between by users. In the example shown, the nodes 70 represent floors or, in some cases, regions of a floor of two building structures A and B, which are connected by a walkway and which share the same print infrastructure 10. A1 for example, represents floor 1 of building structure A. Some floors are subdivided into regions, such as A2-1 and A2-2. There may represent individual rooms, sets of rooms, or the like. The nodes 70 are connected by edges 72, which represent the distance (expressed in walking time in seconds) between a respective pair of connected nodes. These distances can be generated automatically or semi-automatically from an input blueprint. The walking distance between two nodes can be the length of the minimal path connecting them and it can be efficiently computed using an algorithm (e.g., the Dijkstra algorithm set out in E. W. Dijkstra: A note on two problems in connexion with graphs. In Numerische Mathematik, 1 (1959), S269-271). Alternatively, a user can determine the distances by timing the movement of users between the locations.

Figure 5:
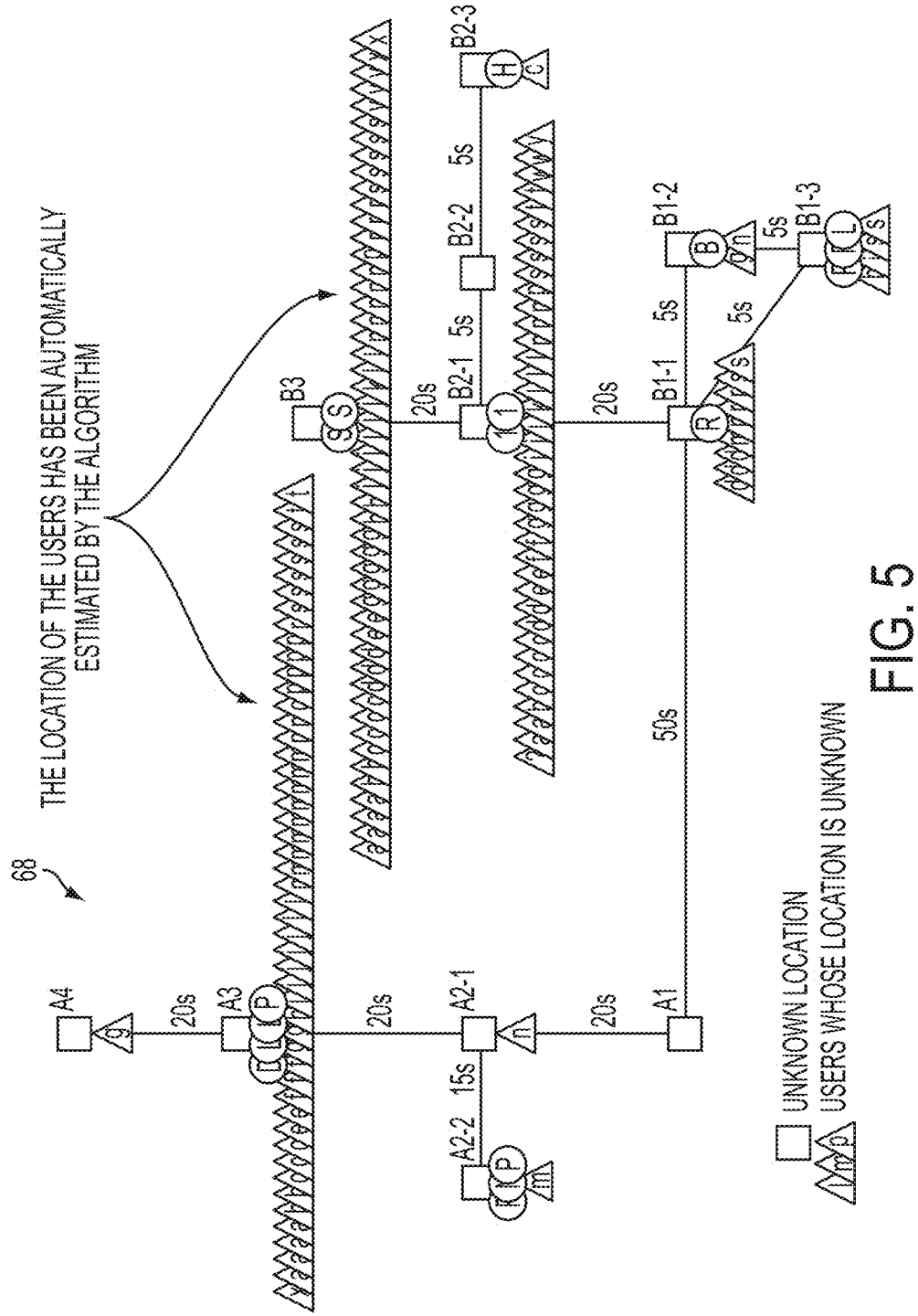
FIG. 5 illustrates the simplified map of a structure following assignment of devices and users to locations corresponding to nodes.

The exemplary graph shows manually annotated locations 74, 76 of a few of the devices (here six printers, represented by circles, each with a device ID-simplified here to an upper case letter) and users (here seven users, represented by triangles, each with a user ID—simplified here to a lower case letter). For example, device 74 is localized at node B2-1 and user 76 is shown to be localized at node A3. Unlocated devices 78 (here fourteen devices) and users 80 (here at least a hundred, each with a user ID) are illustrated at an unknown location 82 off the connectivity graph 60. These users and devices are known to the system, e.g., by their unique IDs, but their specific probable locations in the structure are not yet assigned. The graph 60 need not be symmetric, in some cases, the walking distances may be different depending FIG. 5 illustrates the graph 60 following application of the model, which may be output as the map 68. Here, all but a few users have been assigned to their most probable nodes, leaving only a small number, fewer than those whose locations were initially assigned as unknown, still unknown. In this example, all the devices (circles) have been localized, although it is to be appreciated that in any particular environment, all or fewer than all the devices and/or users may ultimately be assigned to a specific known node.

A. Probabilistic Model

User preferences are modeled using a probabilistic approach. Logs are assumed to contain records of jobs. Each job is primarily described by the user U and device D it involves. U and D are random locations of the model. The basic model 56 outlined in this section only makes use of this information, but the logs may also contain additional information about the job type, the device status, time of submission (timestamp), and the like, which may be utilized in more advanced models described in greater detail below.

Definitions

Assume each user u and each device d has its own physical position, denoted $X_u$ and $Y_d$, for $u=1, \ldots, N_u$ and $d=1, \ldots, N_d$. In a basic implementation (static model), it can be assumed that the positions are constant over time. The model 56, however, can be extended to take into account user and device moves (time-varying model), as described in detail below.

The usage logs can be a sequence of time-stamped user index $u^{(1)}$, device index $d^{(1)}$, and optionally also user (request) features and device features $f_u^{(1)}, f_d^{(1)}$. User (request) features can include the type of job such as color or black-and-white in case of a print infrastructure. Device features can include, for example its status.

In addition to the logs, the model takes as input priors over user and device positions $P(X_u)$ and $P(Y_d)$ which reflect a-priori knowledge (such as the device and user positions manually input). In one embodiment, the locations of users and devices are considered discrete distributions and these can be assigned to nodes, e.g. by assigning probabilities to each of the nodes in FIG. 4. Even if the administrator believes that he knows the exact location of a person or device a probability distribution of locations may be generated (e.g., by assigning a high probability to the most likely node and lower, but non-zero, probabilities to at least some of the other nodes. Thus, incorrect or inaccurate labeling can be corrected. a-priori information on office location can also be used as described below. This information allows certain assumptions to be made by the model 56, such as that a user is not located in an unacceptable location, such as in a corridor or on stairs.

In another embodiment, the locations can have a non-discrete distribution. For perfectly known locations, they can be considered as delta-peaks in the space of possible locations. For roughly known locations, they can be represented as Gaussians with a mean at the best guess (x or y) of the user or device location and a variance reflecting the uncertainty in the estimate. In this embodiment, the distributions may be over a plane rather than nodes of a graph. For completely unknown positions, a relatively flat distribution can be used (e.g., a Gaussian with large variance centered at middle of the site, or a uniform distribution).

Given the positions, the distribution of the logs is decomposed into the user print demand p(u), and a device choice part:

$$p(u,d|x,y)=p(u)p(d|u,x,y) \quad (1)$$

where x is a set of user locations (i.e., a realization of the random variable X) and y is a set of device locations (i.e., a realization of the random variable Y). When user (request) features and device features are also obtained, equation 1 can be adapted to account for these.

Eqn. 1 expresses the probability of a user or device being at a location (x,y) equals the probability that a user will chose a printer based on the user's location and the printer's location. A prediction formula then models the device choice distribution, and captures the expectation that users will most likely print on nearby devices. Many possible distributions can be employed and the best performing one depends on the characteristics of the infrastructure and its users. In one embodiment, an exponential function is used, although other distribution functions are contemplated:

$$p(d|u,x,y) \propto \exp(-\gamma \|x_u - y_d\|) \quad (2)$$

Eqns. 2 expresses the assumption that the probability of a device d being chosen by a given user u exponentially decreases with the distance $\|x_u - x_d\|$ of the device from the user. (Any other suitable decreasing function, could of course, be used). Constant γ controls the noise of the model: if it tends to infinity, users tend to always choose the closest printer. If it is close to zero, users choose their device independently of their positions. In one embodiment, γ assumes the same fixed value for all users. In another embodiment, the constant γ may be user-dependent. Parameter γ can be based on historical experience with a particular infrastructure type. γ can be selected so that the probability of Eqn. 2 is maximized, or can be manually tuned. If previous experience indicates that there is not a single best value, but rather a range of likely values, a prior distribution on γ can reflect this and this can be properly integrated out, as illustrated in the experiments below. The model may use a different probability equation for each type of job, for example, for color printing, one equation may be used and for black-and-white printing, another equation may be used.

The user demand for jobs can be assumed to be the same for all users, or can be learned by the model.

Figure 6:
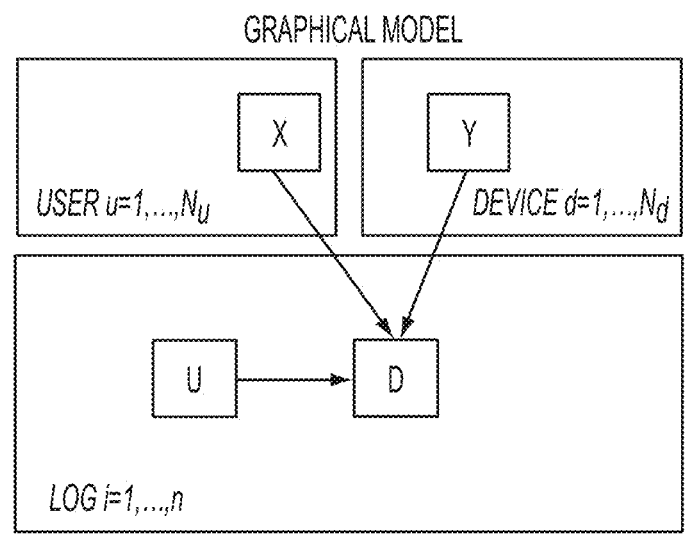
FIG. 6 illustrates a plate representation of a probabilistic graphical model for a static system.

FIG. 6 illustrates an exemplary static probabilistic model. This graph is a probabilistic graphical model, also referred to as a Bayesian Network, that represents the conditional independencies assumed by the probabilistic model. Here, the user and device prior locations are assumed independents.

Inference and Learning

The exemplary model 56, which assumes that users are likely to print more often on the closest users, is used to estimate locations of users by optimizing the fit of the model to the log data.

While maximum likelihood approaches to location determination which only take into account the log data are possible, they only provide a single best estimate. Since the observations are noisy and the information given by a single observation is inherently ambiguous, it is not guaranteed that all devices and all users can be located perfectly. For example, for a user that only uses a single machine during the logging time window, only a relative uncertain estimate of his location can be given. Thus, in the exemplary embodiment, the maximum likelihood approach is penalized by the priors (knowledge about a few element positions).

By computing full posterior distributions, or posterior position marginals, the uncertainty about the values of x and y can be preserved. The method then not only provides the best estimate of the locations x and y, but also gives the full distribution over possible locations. These distributions can be used in future applications of the map (such as device location optimization) or can trigger additional human labeling requests.

The posterior distribution p(X,Y|U,D) can be numerically approximated using various methods. One flexible approach is to use a Gibbs Sampling algorithm. Gibbs sampling is applicable where, as here, a joint distribution is not known explicitly, but a conditional distribution of each variable (here the user and device locations) can be computed. The Gibbs sampling algorithm generates an instance from the distribution of each variable in turn, conditional on the current values of the other variables. In the exemplary method, the system iterates between updating the users positions given those of the devices and vice versa, alternatively. By simulating and storing the values taken by the user and device positions for many iterations, a sample from the posterior distribution is obtained and can be use to predict user location given the prior placements of users and usages logs. The principle is that users with similar profiles are likely to be associated to the same location.

Exemplary software for performing Gibbs sampling includes the Bayesian Inference using Gibbs sampling (BUGS) program (available as the open source code Open-BUGS), and the JAGS program, which is a GPL program for analysis of Bayesian hierarchical models, both of which use Markov Chain Monte Carlo methods.

For the basic model outlined above, the sampling algorithm may proceed as follows:

i) Initialize $Y_u(0)$ ii) Iterate (a) generate $X_d^{(t)}$ according to $P(X_d|X_d^{(t-1)}), Y^{(t-1)}, U, D)$ (b) generate $Y_u^{(t)}$ according to $P(Y_u|X^{(t)}, U=u, D)$ where $Y_u^{(t)}$ are sampled user locations and $X_d^{(t)}$ are sampled device locations. The notation $X_d^{(t)} = (X_1^{(t)}, \ldots, X_{d-1}^{(t)}, X_{d+1}^{(t)}, \ldots, X_D^{(t)})$ is the set of device locations except for device d.

FIG. 7 illustrates exemplary BUGS code for the (basic) static model. An alternative method is variational approximation.

Inferring Positions on a Graph

Where a coarse grain description 62 of the infrastructure environment is available (e.g. via blue prints of an office site), this can be leveraged by incorporating the fact that users and devices are located in offices or other specified spaces.

When a graph 60 is available or generated from a digital blueprint 62, prior distributions only have mass at the nodes 70 in the graph. The device selection probability is then based on a distance metric in the graph. Which edges are available are specified in the graph, the travel time (distance) along each edge may be inferred from data extracted from the input map.

Relatively simple probabilistic models can be used to determine user and device locations based on usage logs. Posterior distributions not only give best estimates but indicate in addition what ambiguities remain and thus capture degrees of confidence. Markov Chain Monte Carlo based estimates of the posterior are demonstrated to accurately learn demand and infer not only position, but also the remaining uncertainty after a given usage signal.

More Advanced Models

The basic model assumes that jobs are executed with some probability on all devices, giving nearby devices a higher probability. This is of course a rough description of reality. In practice, the device choice follows some logic, where the availability of the device and the ability of the nearest device to execute the job play a role.

The basic model works adequately if the logs contain enough data and there is a reasonable mixing of the use of first choice and second choice devices. In such cases the catch-all aggregation of the basic model is a reasonable approximation of reality.

The basic model can give suboptimal results, however, in some cases where these aggregation assumptions are not valid. For example, if there is only a single A3 printing device in a company, and users only print their A3 jobs on this device, the position of this device cannot be determined, based on the information in the print log. The device selection distribution in the basic model assumes a reasonable mixing of jobs however and will deduce, based on this assumption, a position for the A3 device.

In many cases, users can change their location (e.g., office changes), and devices can be moved. To determine accurate maps from logs in which such changes take place, the basic model described above may be adapted to take these changes explicitly into account. One way to do this is by making locations dependent on time and modeling occasional switches between locations. Another implementation allows for more accurate modeling of device status and job type.

FIG. 8 illustrates exemplary BUGS code which can be used to implement a time-varying model. By extending the basic model in this way, more accurate location information can be extracted from the logs, and the above extreme example can be avoided. Such an extended model may have a slightly more elaborate device selection distribution that would take into account the type of the job, the types of jobs a particular device can handle, the status of the device, and the like. Thus, for example, if a user prints predominantly on device D1 during a first time period and predominantly on device D2 during a second time period in which device D2 records that it is not operational, the model can correctly infer that device D1 is closer to the user than device D2 and that device D2 is closer to the user than network devices other than D1.

Without intending to limit the scope of the exemplary embodiment, the following simplified example demonstrates the application of the method to a system in which the location of one device is unknown to the system, while the locations of other devices are known with reasonable specificity.

Simplified Example

The following example using artificially generated data demonstrates the effectiveness of the inference method and the use of posterior distributions.

Two different experiments show the effects of the log characteristics. The logs for the two experiments are presented in Tables 1 and 2, respectively. For these experiments, the locations of devices are not limited by any structure but are assumed to be within a given area. Rough positions for three devices are given for both experiments. A rough position estimate, in this case, is a Gaussian distribution with mean given in the second row of the table, and a variance of 0.1.

TABLE 1

| X  | D1 (0,0) | D2 (1,0) | D3 (0,1) | D4 ? |
|----|----------|----------|----------|------|
| U1 | 3        | 2        | 0        | 1    |
| U2 | 5        | 1        | 1        | 1    |
| U3 | 6        | 1        | 1        | 2    |
| U4 | 1        | 3        | 0        | 1    |
| U5 | 0        | 3        | 1        | 1    |
| U6 | 0        | 0        | 9        | 2    |
| U7 | 1        | 2        | 7        | 2    |
| U8 | 0        | 0        | 2        | 0    |

TABLE 2

| X  | D1 (0,0) | D2 (1,0) | D3 (0,1) | D4 ? |
|----|----------|----------|----------|------|
| U1 | 3        | 2        | 0        | 0    |
| U2 | 5        | 1        | 1        | 0    |
| U3 | 6        | 1        | 1        | 1    |
| U4 | 1        | 3        | 0        | 1    |
| U5 | 0        | 3        | 1        | 3    |
| U6 | 0        | 0        | 9        | 3    |
| U7 | 1        | 2        | 7        | 0    |
| U8 | 0        | 0        | 2        | 3    |

The second row of each table gives the known positions of the devices D1, D2, D3. The position of Device D4 is unknown to the system. Each entry of the following rows is the number of observed interactions between the corresponding user U1-U8 and device (e.g., the number of jobs sent to that printer in a selected log window). In Table 1, although not yet known and assigned by the system, device D4 is actually equidistant from devices D1, D2 and D3. In Table 2, device D4 is far from D1. The object of the model, in this example, is to infer the position of D4.

The plots shown in FIGS. 9 and 10 show samples from the posterior distributions output by the model for the two experiments respectively. Only samples of device locations are shown, samples of user locations are omitted for clarity. The difference in the two experiments is only in the jobs on device D4. The first experiment has all users using device D4 roughly equally often. In the second experiment, device D4 is used more by users that also use device D3 often or device D2 often and hardly by users that frequently execute jobs on device D1. Combined with estimates of the 8 users, this results in an estimate of device D4 roughly at equal distances from devices D1 to D3 in the first experiment and close to D2 and D3 but far from D1 in the second. Note that depending on the available data, the remaining uncertainty in the position of the fourth device can be larger or smaller, and is correctly reflected by the posterior distribution.

Where the model employs a graph 60 as shown in FIGS. 4 and 5, the location of the fourth device D4 would be limited to one of the available nodes which include the known node locations and optionally an "unknown" location. The device location assigned would be the closest node to the distribution mean, or the most popular node, in the case that the output distribution is limited to the node locations.

The usefulness of the model can be extended by showing characteristics such as typical usage volumes per user, typical distance per print, etc.

Applications

Applications of the methods include the monitoring of the infrastructure and the optimization of actions such as addition of a printer, removal of a printer, change in printer type, and user movements. Monitoring is useful to detect abnormal behaviors or to analyze the overall print infrastructure usage, e.g., by identifying "hot spots" on the map that correspond to high usage densities. Optimization of Move/Add/Change actions is a useful component of cost reduction in many print management services. Above-mentioned U.S. application Ser. No. 12/488,900 provides one method for choosing printer locations. Properly choosing the device locations that lead to a significant cost saving can make use of the accurate map of the print infrastructure generated by the exemplary method. Such a map does not normally exist or is out-dated, due to the constant changes that occur in the working environment. For example, if a new printer is to be installed, the best location for the new printer can be determined for the users whose positions are now known. The output can also be used to update the administrator's database of users by detecting that a user's position has been changed.

Another application for the method includes the localization of automated teller machines (ATMs) of a bank by its known users, which can be used to infer user locations and hence propose useful new locations for such devices.

Another example is in the localization of one of a company's stores for optimum location for known shoppers.

The method illustrated in FIG. 3 may be implemented in a computer program product that may be executed on a computer. The computer program product may be a tangible computer-readable recording medium on which a control program is recorded, such as a disk, hard drive, or the like. Common forms of tangible computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for localizing devices and users of an infrastructure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of localizing elements in a device infrastructure comprising:
    mapping a structure in which elements of a device infrastructure are located, the elements comprising shared devices and users of the shared devices, wherein probable locations of fewer than all of the elements in the structure are mapped, at least some of the elements being initially assigned to an unknown location;
    acquiring usage logs for a plurality of the shared devices, the acquired usage log for each device comprising a user identifier for each of a set of uses of the device, each of the uses having been initiated from a respective location within the mapped structure by one of the users;
    with a processor of a computing device, based on the acquired usage logs and the input probable locations of some of the elements, predicting a location of at least one of the elements initially assigned to an unknown location, the prediction being based on a model which infers that for each of a plurality of the users, a usage of at least some of the shared devices by the user is a function of respective distances between the user and each of those devices; and
    outputting the predicted locations.

2. The method of claim 1, wherein the devices are printers.

3. The method of claim 2, wherein each use of a device comprises a print job.

4. The method of claim 3, wherein the usage logs comprise information about a type of print job, and where fewer than all of the printers are capable of printing that type of print job, the prediction takes into consideration information on which of the printers are capable of performing that type of print job.

5. The method of claim 1, wherein the prediction includes predicting locations for a plurality of the users whose assigned locations are initially unknown.

6. The method of claim 1, wherein the prediction includes predicting locations for a plurality of the shared devices whose assigned locations are initially unknown.

7. The method of claim 1, further comprising receiving location information for at least one of the elements and wherein the predicting of the location of at least one other of the elements is based on the location information.

8. The method of claim 1, wherein the mapping comprises representing the structure as a graph comprising a set of nodes, each node representing a different location in the structure, edges connecting the nodes representing distances between the nodes, and wherein the prediction includes assigning at least one of the nodes a probability of being the location of at least one of the elements.

9. The method of claim 1 wherein the distances are expressed as approximate walking times.

10. The method of claim 1, wherein for a plurality of devices, in the model, a probability of a device being chosen by a given user is an exponentially decreasing function of a distance of the device from that user.

11. The method of claim 10, wherein the model infers that the probability p of a device d being chosen by a given user u at locations x and y respectively, exponentially decreases with the distance of the device from the user according to the equation:

$$p(d|u,x,y) \propto \exp(-\gamma \|x_u - y_d\|) \quad (2)$$

where $\gamma$ is a constant which is greater than 0 and less than 1.

12. The method of claim 11, wherein $\gamma$ is from 0.1 to 0.9.

13. The method of claim 11, wherein the probability p is based on maximizing equation (2).

14. The method of claim 1, wherein in the prediction, Gibbs sampling is used to sample posterior distributions of device and user locations output by the model.

15. The method of claim 1, wherein the usage log of each device further comprises time stamps for each of the set of uses of the device, and wherein the model applies a time-varying function for inferring at least one of the element locations.

16. A computer program product comprising a non-transitory medium encoding instructions, which when executed on a computer causes the computer to perform the method of claim 1.

17. A system for localization of shared devices and device users, comprising:
    memory which stores instructions for performing the method of claim 1 and a processor in communication with the memory for executing the instructions.

18. The method of claim 1, wherein the shared devices comprise printers; and
    the acquiring usage logs comprising acquiring print job data for the printers which includes, for each submitted print job, a user identifier.

19. A system for localization of elements in a device infrastructure, comprising:
    a graphing component which graphs an associated structure and probable locations of fewer than all of the elements that are located within the structure, the elements comprising associated shared devices and associated users of the shared devices;
    an acquisition component which acquires usage log data for a plurality of the associated shared devices in the device infrastructure, the usage log of each device comprising a user identifier for each of a set of uses of the device, each of the uses having been initiated from a respective location by one of the users
    a predicting component configured for predicting locations of elements for which the location in the graphed structure is initially assigned as being unknown, based on the acquired usage logs, the prediction being based at least in part on a model which infers that usage of at least some of the devices by associated users is a function of a distance between the user and the respective device; and
    a computer processor which implements the graphing component, acquisition component, and predicting component.

20. A printing system comprising the localization system of claim 19, wherein the shared devices comprise printers and the uses comprise print jobs.

* * * * *